United States Patent
Rouphael et al.

(10) Patent No.: US 6,278,725 B1
(45) Date of Patent: Aug. 21, 2001

(54) AUTOMATIC FREQUENCY CONTROL LOOP MULTIPATH COMBINER FOR A RAKE RECEIVER

(75) Inventors: Antoine J. Rouphael, Melbourne, FL (US); Farbod Kamgar, Campbell, CA (US)

(73) Assignee: Philips Electronics North America Corporation, New York, NY (US)

( * ) Notice: Subject to any disclaimer, the term of this patent is extended or adjusted under 35 U.S.C. 154(b) by 0 days.

(21) Appl. No.: 09/216,264

(22) Filed: Dec. 18, 1998

(51) Int. Cl.[7] .............................. H04B 1/707; H04L 27/00
(52) U.S. Cl. .............................................. 375/148; 375/344
(58) Field of Search .................................. 375/147, 148, 375/150, 344; 370/335, 342, 441

(56) References Cited

U.S. PATENT DOCUMENTS

| 5,594,754 | 1/1997 | Dohi et al. | 375/200 |
| 5,675,616 | 10/1997 | Hulbert et al. | 375/355 |
| 5,818,882 | * 10/1998 | Komatsu | 375/344 |
| 5,953,366 | * 9/1999 | Naruse et al. | 375/200 |

FOREIGN PATENT DOCUMENTS

| 0853389A2 | 7/1998 | (EP) | H04B/1/707 |
| 0856962A2 | 8/1998 | (EP) | H04H/1/00 |
| WO9428640 | 12/1994 | (WO) | H04B/7/005 |

OTHER PUBLICATIONS

By Urs Fawer, Student Member, IEEE A Coherent Spread–Spectrum Diversity–Receiver With AFC for Multipath Fading Channels. IEEE Transactions on Communications, vol. 42, No. 2/3/4, Feb./Mar./Apr., 1994. pp. 1300–1311.

* cited by examiner

*Primary Examiner*—Amanda T. Le
(74) *Attorney, Agent, or Firm*—Dicran Halajian

(57) ABSTRACT

A Rake receiver having fingers is disclosed. The Rake receiver includes frequency discriminators for automatic frequency control and a combiner. Each finger includes a frequency discriminator. The combiner combines outputs from the frequency discriminators to output an average error signal which is fed back to the frequency discriminators for removing frequency offsets from all the fingers. The combiner includes an adder which adds the outputs of the frequency discriminators, and a divide circuit which divides the combined adder output by the number of the outputs which were added together to form the average error signal. The combiner further includes a filter connected between the adder and the divide circuit. In addition, further adders are provided where each of theses adders receives the average error signal and a respective one of the outputs from the frequency discriminators in order to provide an estimate of one of the frequency offsets.

11 Claims, 3 Drawing Sheets

AUTOMATIC FREQUENCY CONTROL LOOP MULTIPATH COMBINER FOR A RAKE RECEIVER

BACKGROUND OF THE INVENTION

1. Field of the Invention

The present invention is directed to an automatic frequency control (AFC) loop multipath combiner for a RAKE receiver, and more particularly, to an AFC combiner which removes the Doppler frequency offsets from all the RAKE fingers.

2. Discussion of the Prior Art

Typically in terrestrial communication, a receiver receives a transmitted signal which has traveled through a direct path and indirect paths. Propagation through the indirect paths, referred to as multipath propagation, results from the transmitted signal being reflected and refracted by surrounding terrain. The multipath signals traveling through the indirect paths undergo frequency and time offsets.

To exploit the energy in the multiple components of multipath propagation of a transmitted signal, a RAKE receiver is used which has multiple parallel demodulators for receiving different multipath components of the transmitted signal. Each multipath component demodulator is called a "finger" of the RAKE receiver. The RAKE receiver identifies and acquires the multiple components of multipath propagation with the aid of a pilot signal. As well known to those skilled in the art, a RAKE receiver collects and combines the energy from the distinct paths.

Typically a RAKE receiver uses an automatic frequency control (AFC) loop for initial frequency acquisition and Doppler frequency adjustment of the received signal which has been disturbed by noise and multipath. The Doppler frequency offsets of the disturbed or faded signals are often unknown. A balanced discrete quadri-correlator or cross-product automatic frequency control (CP-AFC) loop structure is used to obtain the unknown frequency offsets.

In the CP-AFC loop, the unknown frequency offset is obtained through differentiation as will be described in connection with equations (5) and (7). To derive the CP-AFC, consider an optimal phase estimator structure 10 shown in FIG. 1. As shown in FIG. 1, a received signal y(t) is provided to two mixers 12, 14, which respectively receive locally oscillating signals 16, 18 having a 90° phase difference. These two signals are provided from a local oscillator, such as a voltage controlled oscillator (VCO) 20, where one of the signals passes through a 90° phase shifter 22. The outputs of the two mixers 12, 14 are provided to two integrators (or lowpass filters) 32, 34, respectively.

The received signal y(t) is expressed by equation (1):

$$y(t)=\sqrt{2}A \sin[\hat{\omega}t+(\omega-\hat{\omega})t+\theta]+n(t) \tag{1}$$

where:

$\hat{\omega}$ is the frequency of the local oscillator 20;

$\omega$ is the frequency of the received signal y(t);

$\theta$ is an unknown constant carrier phase; and n(t) is noise.

Combining the frequency difference term $(\omega-\hat{\omega})$ with the unknown constant carrier phase e into one unknown time variant phase $\theta(t)$, equation (1) is rewritten as equation (2):

$$y(t)=\sqrt{2}A \sin[\hat{\omega}t+\theta(t)]+n(t) \tag{2}$$

In the noise free case, the outputs of the integrators or lowpass filters 32, 34 are given by equations (3) and (4):

$$y_c(t)=A \cos\theta(t) \tag{3}$$

and $$y_s(t)=A \sin\theta(t) \tag{4}$$

As seen from equations (3) and (4), the purpose of the lowpass filters (LPFs) 32, 34 is to suppress the double frequency term resulting from the product of y(t) with the locally oscillating signals 16, 18. The difference $(\omega-\hat{\omega})$ between the received signal frequency $(\omega)$ and the local oscillator frequency $(\hat{\omega})$ is given by equation (5):

$$\omega - \hat{\omega} = \frac{d}{dt}\theta(t) = \frac{d}{dt}\left[\operatorname{atan}\left(\frac{y_s(t)}{y_c(t)}\right)\right] \tag{5}$$

where $\theta(t)$ is the output of the phase estimator 10 shown in FIG. 1.

Using the identity shown in equation (6):

$$\frac{d}{dt}[\operatorname{atan} f(t)] = \frac{f'(t)}{1+f^2(t)} \tag{6}$$

equation (5) can be expressed as equation (7):

$$\omega - \hat{\omega} = \frac{d}{dt}\theta(t) = \frac{d}{dt}\left[\operatorname{atan}\left(\frac{y_s(t)}{y_c(t)}\right)\right] = y'_c(t)y_s(t) - y'_s(t)y_c(t) \tag{7}$$

Because of the differentiator in equation (5), a CP-AFC structure realization of equation (5) is also known as the differentiator AFC. In the discrete domain, the differentiator AFC structure can be easily derived by replacing the derivative dy(t)/dt at time t=nΔT by the expression shown in equation (8):

$$\left(\frac{d}{dt}y(t)\right)\bigg|_{t=n\Delta T} = \frac{y(n\Delta T)-y(n\Delta T - \Delta T)}{\Delta T} = \frac{y(n)-y(n-1)}{\Delta T} \tag{8}$$

where ΔT represents the sampling period. The analog differentiator dy(t)/dt has a system transfer function H(s)=s, whereas the discrete system has the transfer function given by equation (9) which can be deduced from equation (8):

$$H(z) = \frac{1-z^{-1}}{\Delta T} \tag{9}$$

Consequently, the mapping between the analog and the discrete domains is governed by equation (10):

$$s = \frac{1-z^{-1}}{\Delta T} \tag{10}$$

Note that the mapping in equation (10) is only suitable for lowpass and bandpass filters having relatively small resonant frequencies.

In order to derive the structure for the discrete-time differentiator AFC, equation (8) is substituted into equation (7) to yield equation (11):

$$y'_s(t)y_c(t)-y'_c(t)y_s(t)\approx [1/\Delta T][y_s(n-1)y_c(n)-y_c(n-1)y_s(n)] \tag{11}$$

The realization of equation (11) is a discrete differentiator AFC (or CP-AFC) loop structure depicted in FIG. 2, which will be described later.

The relation in equation (11) can be further expressed as equation (12):

$$y'_s(t)y_c(t)-y'_c(t)y_s(t)\approx [1/\Delta T]\sin(\Delta T\Delta\omega) \tag{12}$$

where $\Delta\omega=\omega-\hat{\omega}$.

When operating in the linear region (i.e., theoretically $\Delta\omega\Delta T<<1$), the error signal $D(\omega-\hat{\omega})$ is directly proportional to the difference between the received signal and local oscillator frequencies. The relationship is no longer linear when $\Delta\omega$ becomes large.

FIG. 2 shows a typical cross-product (CP) AFC 100 having a frequency discriminator (FD) 110 which is a realization of the expression shown in equation (11). Similar to the phase estimator 10 of FIG. 1, the received signal y(t) is provided to the two mixers 12, 14 for down conversion using locally oscillated signals 16, 18 which are 90° apart and provided from the VCO 20, where one signal is phase shifted by a 90° phase shifter. For clarity, the 90° phase shifter 22, shown in FIG. 1, is omitted from FIG. 2.

The down-converted signals pass through respective analog-to-digital A/D converters 120, 125, integrators 130, 135, and dump or low-pass filters 140, 145. The output signals of the dump filters 140, 145 are indicated as $y_s$ and $y_c$, respectively, which are the input signals to the frequency discriminator 110. The first signal $y_s$ passes though a first delay element 150 and a first mixer or multiplier 155. Similarly, the second signal $y_c$ passes though a second delay element 160 and a second mixer or multiplier 165. The first signal $y_s$ is also provided to the second mixer 165, while the second signal $y_c$ is also provided to the first mixer 155.

The outputs of the two mixers 155, 165 are provided to a combining circuit 170, such as a substractor or an adder, where one of the adder inputs 170 is inverted to result in subtraction of its two inputs. The output of the adder 170 is the difference signal shown on the left side of equations (11) and (12). This difference signal from the adder 170 is an estimate of the frequency error.

The difference signal from the adder 170 is provided to other circuits for processing. In addition, the difference signal from the adder 170 is fed back to the VCO 20 through a loop filter 175 and a digital-to-analog (D/A) converter 180. The output of the loop filter 175 is an estimate of the frequency offset. The D/A converter 180 converts its digital input to an analog signal which is used to adjust the frequency of oscillation of the VCO 20.

The output of the VCO 20 is then fed back to either the frequency discriminator (FD) 110 or to intermediate frequency (IF) mixers to form what is referred to as a short loop or a long loop, respectively. In FIG. 2, the output of the VCO is fed back to the mixers 12 and 14, where the 90° phase shifter 22 (FIG. 1) is provided between the VCO 20 and the mixer 12 as described in connection with FIG. 1.

For simplicity, short and long loops are not distinguished in FIG. 2, since FIG. 2 shows only one set of mixers 12, 14 which convert the received RF signal to baseband signals which are provided to the A/D converters 120, 125. However, typically two sets of mixers are provided; IF mixers which convert the received radio frequency (RF) signal to an intermediate frequency (IF) signals 90° apart; and zero IF mixers which convert the IF signals to the baseband signals for input to the A/D converters 120, 125. A short loop connects the VCO to the IF mixers and a long loop connects the VCO to the zero IF mixers. Typically, an RF filter is provided between the IF and zero IF mixers.

The mixers 155, 165 of the frequency discriminator (FD) 110 play the role of correlation detectors. That is, the received signal y(t) is cross-correlated with signals 18, 16 from the VCO 20 and phase shifter 22 (FIG. 1), namely, with $\sin(\hat{\omega}t)$ and $\cos(\hat{\omega}t)$. The results of this cross-correlation are the respective outputs $\sin[(\omega-\hat{\omega})t]$ and $\cos[(\omega-\hat{\omega})t]$ from the two mixers 14, 12. This is the noise free case. In the presence of noise, however, the sine and cosine terms are contaminated with an additive broadband noise term, which at low signal-to-noise-ratio (SNR) tends to dominate the original sinusoidal signals. Note that the desired signals (sinusoids) are very close to the baseband signal when compared to the overall bandwidth (BW) of the noise.

The signals provided from the mixers 12, 14 are digitized by the A/D converters 120, 125. In order to improve the SNR, the digitized signals are then passed through integrate-and-dump or appropriate low pass filters 130, 140 and 135, 145, respectively. This smooths out the noise. Next, the filtered signals are passed through the differentiator circuit or frequency discriminator 110 which comprises the two delays 150, 160, the two multipliers 155, 160, and the adder 170. The output of the adder 170 is the difference signal which is fed back to the VCO as described above.

In CDMA IS95 based systems, during the pilot acquisition stage, the mismatch between the frequency $\omega$ of the received signal y(t), and the frequency $\hat{\omega}$ of the local oscillator 20 can be on the order of several Khz, such as up to 6 KHz or more, depending on the oscillator frequency. This frequency mismatch is due to the Doppler frequency shift. At this stage, the AFC 100 is used to correct for the frequency mismatch. During steady state, the AFC 100 attempts to track the Doppler frequency shift. For a carrier frequency between 800 MHZ and 900 MHZ, the Doppler shift is typically around 90 Hz. For personal communication system (PCS) applications, the Doppler shift can be as high as 300 Hz.

In a conventional Rake receiver, an AFC can operate on the combination of frequency offsets obtained from various fingers by placing various frequency detectors on each finger. This method results in a frequency offset estimate which is the average of frequency offset estimates present in the various Rake fingers. However, in this method, only the weighted average frequency offset is removed from each path. The result is to leave each finger with a frequency offset error equal to the difference between the center frequency of the received signal multipath and the estimated average frequency. This, in turn, could also introduce additional offsets and errors depending on the strength of the pilots present in each finger, thus reducing the performance of the system.

In conventional Rake receivers with AFC circuits, the frequency offsets remain in one or more of the Rake fingers causing additional degradation to the system's performance. Accordingly, there is a need for a Rake receiver with AFC circuits that remove the frequency offsets from all the Rake fingers.

SUMMARY OF THE INVENTION

The object of the present invention is to provide a Rake receiver with an automatic frequency control (AFC) loop structure and AFC method which eliminates the problems of conventional AFC loops for Rake receivers.

Another object of the present invention is to provide an AFC loop structure and method for a Rake receiver which causes minimal performance degradation.

A further object of the present invention is to provide a Rake receiver with AFC circuits that remove the frequency offsets from all the Rake fingers.

A still further object of the present invention is to provide a receiver that has superior performance despite multipath signals.

The present invention accomplishes the above and other objects by providing a method for automatic frequency control (AFC) in a Rake receiver, and an AFC system for a Rake receiver used for a wireless handset with code division multiple access (CDMA) modulation, for example. The Rake receiver has fingers and includes frequency discrimantors and a combiner. Each finger includes a frequency discrimantor. The combiner combines outputs from the frequency discrimantors to output an average error signal which is fed back to the frequency discrimantors for removing frequency offsets from all the fingers.

The combiner includes an adder which adds the outputs of the frequency discriminators to form a sum signal, and a divide circuit which divides the sum signal by the number of the frequency discriminators to form the average error signal. The combiner further includes a filter connected between the adder and the divide circuit. In addition, further adders are provided where each of theses adders receives the average error signal and a respective one of the outputs from the frequency discriminators in order to provide an estimate of a respective offsetted frequency.

BRIEF DESCRIPTION OF THE DRAWINGS

Further features and advantages of the invention will become more readily apparent from a consideration of the following detailed description set forth with reference to the accompanying drawings, which specify and show preferred embodiments of the invention, wherein like elements are designated by identical references throughout the drawings; and in which.

DETAILED DESCRIPTION OF THE INVENTION

Figure 1:
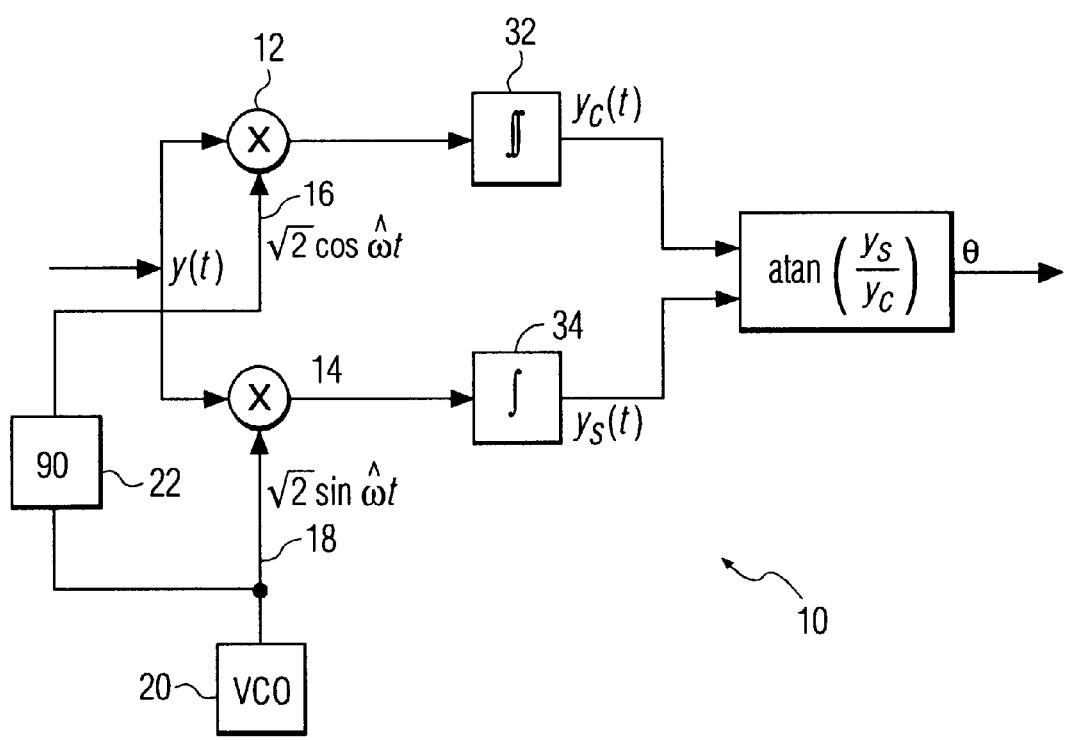
FIG. 1 shows a conventional phase estimator.
Figure 2:
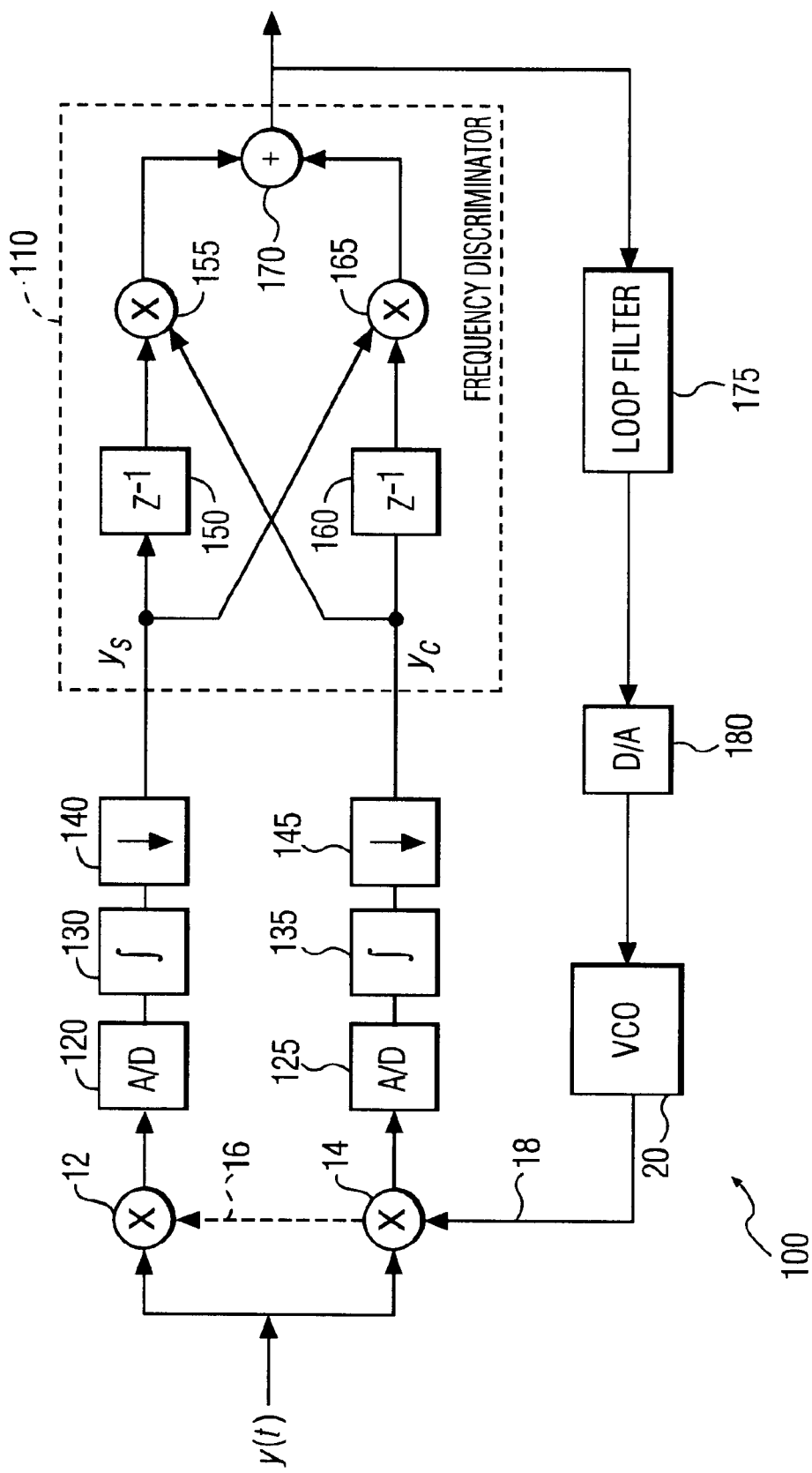
FIG. 2 shows a conventional discrete differentiator cross-product automatic frequency control (AFC) circuit.
Figure 3:
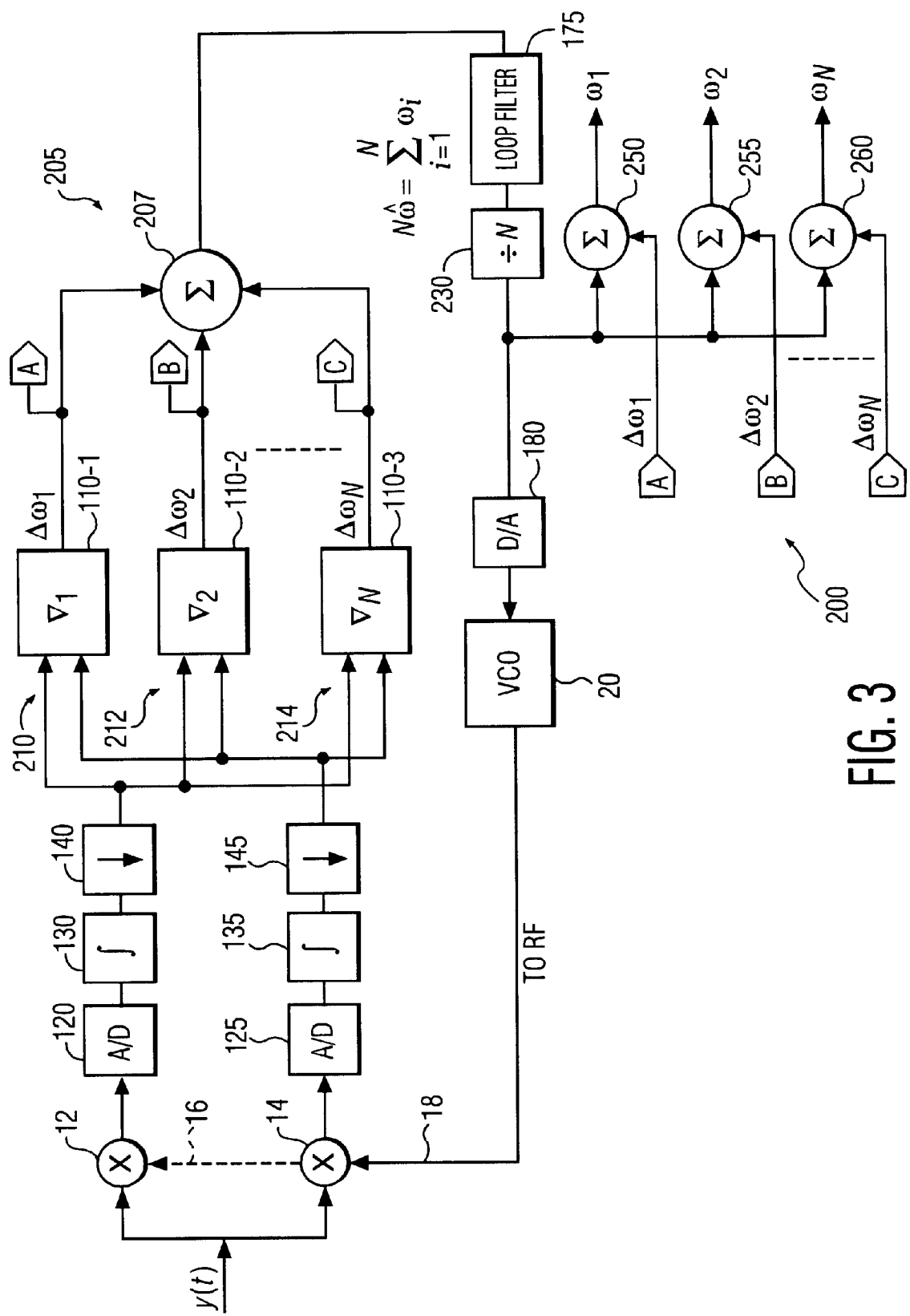
FIG. 3 shows a Rake receiver with an AFC combiner according to present invention.

FIG. 3 shows a Rake receiver 200 with an AFC combiner 205. The AFC combiner 205 comprises at least three frequency discriminator 110-1, 110-2, 110-3, and an adder 207. Illustratively, three Rake fingers 210, 212, 214 are shown in FIG. 3. Unlike the conventional AFC configurations shown in FIGS. 1 and 2, where the frequency errors remain in one or more of the Rake fingers causing additional degradation to the system's performance, the Rake receiver 200 shown in FIG. 3 has the AFC combiner 205 which removes the frequency offsets or errors from all the Rake fingers 210, 212, 214. This, in essence, removes all the causes for performance degradations induced by the various frequency offsets in the system. The frequency offsets or errors $\Delta\omega_1$, $\Delta\omega_2$, $\Delta\omega_N$ at the output of each finger 210, 212, 214 are then added at the combiner stage 205 by the adder 207 without fear of symbol cancellation or degradation.

FIG. 3, the operation $\{\nabla_i: i=1:N\}$ denotes the ith frequency discriminator, where i is from 1 to N. N is typically set to 3, and illustratively three frequency discriminators 110-1, 110-2, 110-3, are shown in FIG. 3. However, it is understood that up to N frequency discriminators may be used. Each frequency discriminator is of the type shown in greater detail in FIG. 2. Further, as described in connection with FIG. 2, RF and IF mixers may be present and the VCO connected to either or both the RF and IF mixers to form long and short loops.

As shown in FIG. 3, each Rake finger 210, 212, 214, has its own discriminator 110-1, 110-2, 110-3. The frequency offsets in each path of the Rake receiver are different due to various Doppler shifts at which these signals are received. This is particularly true during handoffs in wireless telephones, where the mobile station or telephone is served by two or more base stations simultaneously.

The output of the adder 207 is provided to a divide by N circuit 230 through a loop filter 175. The output of the divide by N circuit 230 is fed back to the mixers 12, 14, through the digital-to-analog (D/A) converter 180 and voltage controlled oscillator (VCO) 20, similar to that shown in FIG. 2. As in FIG. 2, two signals 16, 18 are provided to two mixers 12, 14 for down-converting the received signal y(t), and the outputs of the mixers 12, 14 are provided to the frequency discriminators 110-1, 110-2, 110-3 after passing through analog-to-digital (A/D) converters 120, 125, integrators 130, 135 and dump filters 140, 145.

Adders 250, 255, 260 are also provided to receive the outputs ($\Delta\omega_i=\omega_i-\hat{\omega}$, i=1 to N) of the frequency discriminator 110-1, 110-2, 110-3, respectively, and the output $\hat{\omega}$ of the divide by N circuit 230. The outputs of these adders 250, 255, 260 are the rough estimates ($\omega_i$,i=1 to N) of the actual shifted frequencies present in each Rake finger. Thus, the frequencies provided from adders 250, 255, 260 are the corrected frequencies as shifted by the Doppler shift. The shifted or corrected frequencies are used to produce nearly offset free-multipath signals.

The output of each frequency discriminator 110-1, 110-2, 110-3 is an error signal defined in equation (13):

$$\Delta\omega_i=\omega_i-\hat{\omega} \tag{13}$$

where:
i is the particular finger and varies from 1 to N,
N is last finger which is 3 in the illustrative example shown in FIG. 3;
$\omega_i$ is frequency of the signal received by the $i^{th}$ finger; and
$\hat{\omega}$ is the average estimated sum of all the frequency offsets in the RAKE receiver.
In particular, $\hat{\omega}$ is given by equation (14)

$$\hat{\omega} = \frac{1}{N}\sum_{i=1}^{N} \omega_i \tag{14}$$

The input to the loop filter 175 in FIG. 3 is the combined error signal shown in equation (15):

$$\nabla = \sum_{i=1}^{N} \nabla_i = \sum_{i=1}^{N} \omega_i - N\hat{\omega} \tag{15}$$

At steady state, that is after the loop has settled, the output of the divide by N circuit 230 is the average frequency estimate given by equation (16):

$$\hat{\omega} \approx \frac{1}{N}\sum_{i=1}^{N} \omega_i \tag{16}$$

In order to remove the Doppler frequency offset from each finger, combiners, e.g., adders 250, 255, 260, are provided to combine, e.g., add, the average frequency estimate $\hat{\omega}$ given by equation (16) with the output of each frequency discriminator 110-1, 110-2, 110-3. The output of the adders 250, 255, 260 is a rough estimate ($\omega_i$, i=1 to N) of the actual shifted frequency, as offset by the Doppler shift, present in each RAKE finger". These estimates $\omega_i$ provided from the adders

250, 255, 260 are further refined by the moving average filters, which are similar to the integrate 130, 135 and dump filters 140, 145, and are used to remove existing frequency offsets from each finger 210, 212, 214.

The removal of these Doppler frequency offsets $\Delta\omega_i$ from each finger to ascertain the received or shifted frequencies $\omega_i$ enhances the signal to noise ratio and removes the degradation due to frequency offsets. As understood by those skilled in the art, it is necessary to normalize the output of each frequency detector by the power of each paths in order to properly deal with fading. Illustratively, the Rake receiver 200 is used for wireless telephones or handsets with code division multiple access (CDMA) modulation, such as cellular CDMA phones or cordless spread spectrum phones.

While the invention has been particularly shown and described with respect to illustrative and preferred embodiments thereof, it will be understood by those skilled in the art that the foregoing and other changes in form and details may be made therein without departing from the spirit and scope of the invention which should be limited only by the scope of the appended claims.

What is claimed is:

1. A Rake receiver having fingers comprising:
   frequency discriminators;
   a combiner which combines outputs from said frequency discriminators to output an average error signal, said average error signal being fed back to said frequency discriminators for removing frequency offsets from said fingers; and
   adders each receiving said average error signal and a respective one of said outputs to provide an estimate of a respective offsetted frequency.

2. The Rake receiver of claim 1, wherein each of said fingers includes one of said frequency discrimantors.

3. The Rake receiver of claim 1, wherein said combiner includes a further adder which adds said outputs to form a sum signal; and a divide circuit which divides said sum signal by a number of said outputs.

4. The Rake receiver of claim 3, wherein said combiner further includes a filter connected between said adder and said divide circuit.

5. An automatic frequency control for a Rake receiver having fingers comprising:
   frequency discriminators;
   a combiner which combines outputs from said frequency discriminators to output an average error signal, said average error signal being fed back to said frequency discriminators for removing frequency offsets from said fingers; and
   adders each receiving said average error signal and a respective one of said outputs to provide an estimate of a respective offsetted frequency.

6. The automatic frequency control of claim 5, wherein each of said fingers includes one of said frequency discriminators.

7. The automatic frequency control of claim 5, wherein said combiner includes a further adder which adds said outputs to form a sum signal; and a divide circuit which divides said sum signal by a number of said outputs.

8. The automatic frequency control of claim 7, wherein said combiner further includes a filter connected between said adder and said divide circuit.

9. A method for automatic frequency control in a Rake receiver having fingers comprising the steps of:
   frequency discriminating inputs of said fingers to form discriminated outputs using frequency discriminators;
   combining said discriminated outputs to form an average error signal;
   feeding back said average error signal to said frequency discriminators for removing frequency offsets from said fingers; and
   adding said average error signal with a respective one of said discriminated outputs to provide an estimate of a respective offsetted frequency.

10. The method of claim 9, wherein said combining step includes the steps of:
    adding said discriminated outputs to form a sum signal; and dividing said sum signal by a number of said discriminated outputs.

11. The method of claim 10, further comprising filtering said sum signal.

* * * * *